Patented May 2, 1933

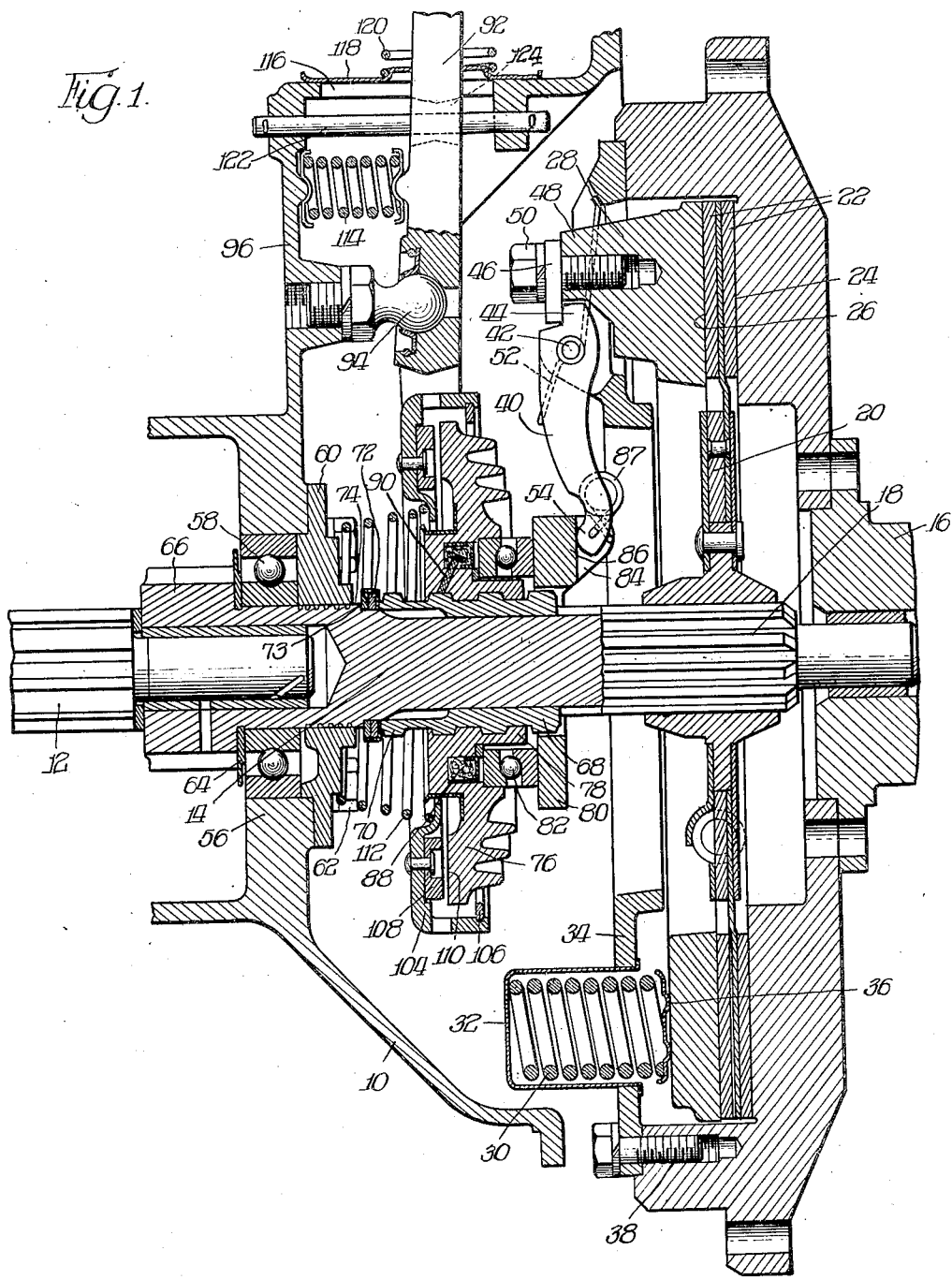

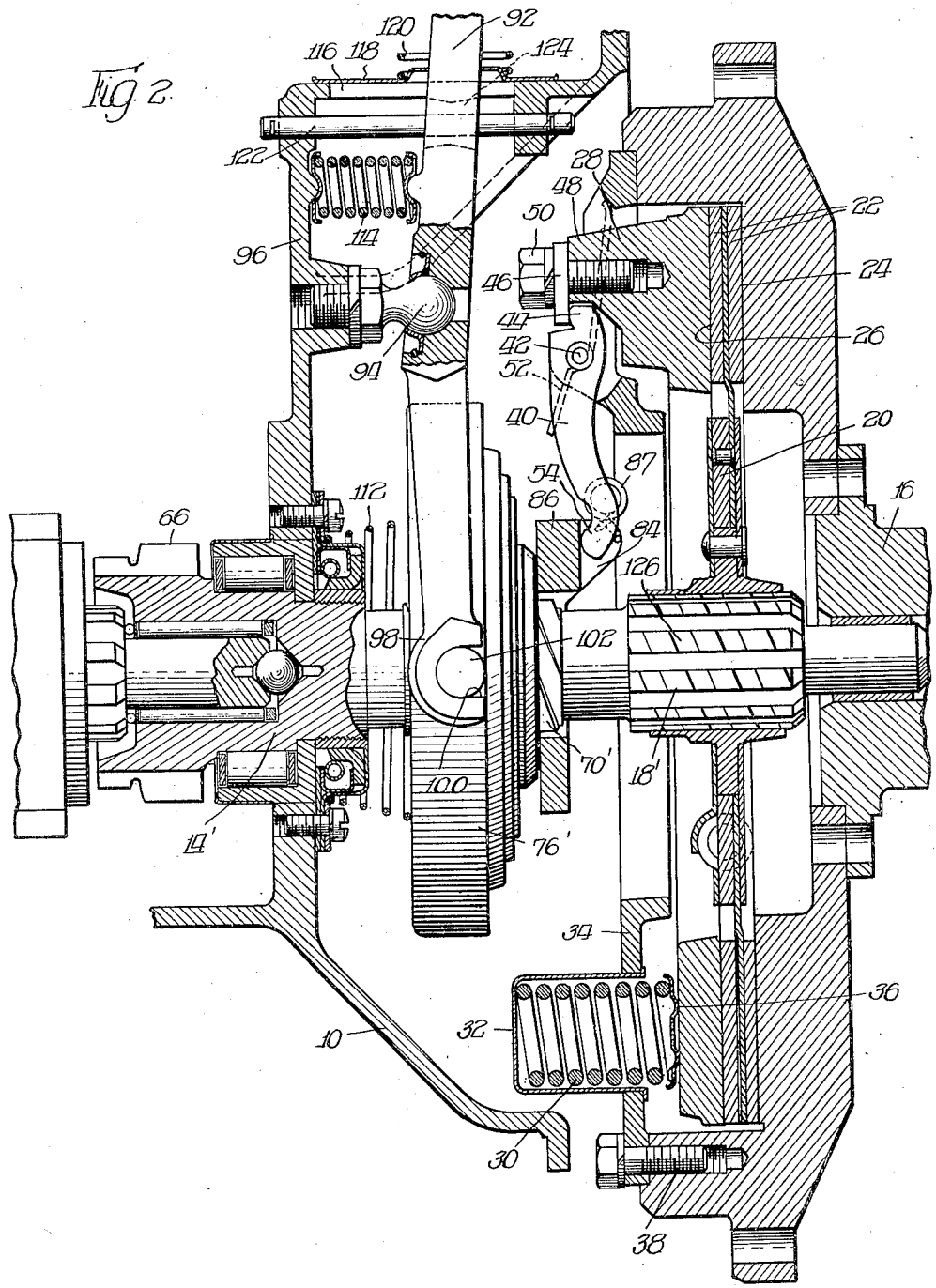

1,907,008

UNITED STATES PATENT OFFICE

EDWARD A. ROCKWELL, OF CHICAGO, ILLINOIS

SERVO CLUTCH

Application filed July 30, 1931. Serial No. 553,982.

This invention relates to improvements in a servo clutch for use in association with a motor vehicle.

It has been previously proposed to provide power means between a brake pedal and the wheel brakes of a vehicle associated with a power shaft of the vehicle in such a manner that a very light pressure upon the brake pedal is amplified by the power means to develop a high braking pressure for applying the wheel brakes. Where such a system is employed it is highly desirable that the clutch pedal also be operable with a relatively light pressure.

It is, therefore, a purpose of the present invention to disclose a mechanism for operating a vehicle clutch in such a manner that the pressure applied to a clutch pedal or lever is amplified by power means associated with a power shaft of the vehicle to produce actuation of the clutch.

It is further a purpose of the present invention to provide an element normally rotatable with but retardable with respect to a power shaft of a vehicle and so arranged that relative axial movement of the driven element will open or disengage the clutch against the resistance of the usual resilient means holding the clutch in normal closed or engaged position and to produce the axial movement of the element by applying pressure from a clutch pedal or lever which will serve to retard the normal rotation of the element with the power shaft and thereby produce axial movement of the element in a direction to open the clutch.

Further objects and advantages of the present improvements will be more readily apparent from the following description taken in connection with the attached drawings, in which specific embodiments are illustrated.

Figure 1 is a vertical section taken through the improved mechanism, and

Figure 2 is a similar vertical section illustrating certain modifications.

In Figure 1, the housing 10 is a portion of the transmission housing. The shaft 12 is a transmission shaft rotatably supported in stub shaft 14 which is rotatably supported at its right hand end in the engine fly wheel forming one of the clutch members. The stub shaft 14 is provided with straight splines 18 and a driven clutch member 20 is carried by the shaft 14 and keyed thereto by the splines 18. The driven clutch member 20 may be of any usual construction but is here shown to be in the form of a disk and has friction rings 22—22 secured to the opposite sides of its marginal edge. The driven clutch member 20 is rotatable between a friction surface 24 of the driving clutch member 16 and the friction surface 26 of a laterally movable pressure plate 28 which is rotatable with member 16.

The plate 28 is normally urged in a direction to produce frictional contact with the driven clutch member 20 by the usual springs 30, only one of which is shown. The spring 30 reacts between a cup-shaped cover 32, carried by a plate 34 and a disk 36 which seats upon the pressure plate 28. The plate 34 is secured to the member 16 by bolts 38 and carries suitable clutch opening levers 40, only one of which is shown, pivoted at 42. The end 44 of the lever extends beneath a washer 46 which is secured to a projection 48 of the pressure plate 28 by a bolt 50. The lever 40 is held in normal position by the spring 52, shown in dotted lines.

By applying pressure to the rounded end 54 of the lever 40, the pressure plate 28 will be moved against the resistance of spring 30 and release the frictional drive from the driving member to the driven member of the clutch. The springs, which hold the clutch in engaged position, are necessarily rather strong and it is usually necessary to employ a considerable leverage between the clutch pedal and the clutch in order that the pressure applied by the operator to the clutch pedal need not be excessive. In such case the travel of the clutch pedal is necessarily considerable.

It is a feature of the present invention that the operator is only required to apply a light pressure upon the clutch pedal and produce a relatively short travel of the clutch pedal in order to disengage the clutch.

The mechanism for actuating the clutch is disposed between the clutch members and the bearing support for the stub shaft 14 and the web 56 of the housing 10. The shaft is supported by ball bearing 58 held in the web 56 by a plate 60 secured by bolts 62 for urging the bearing 58 against a disk 64 and a transmission gear 66 formed integral with the shaft 14. Slidable upon the stub shaft 14 from the right hand end thereof is a sleeve 68 provided with internal straight splines cooperating with the splines 18 of the shaft 14 for rotation with the shaft. The sleeve 68 is formed with an external spiral thread 70. The sleeve 68 abuts at its forward end against a cushioning abutment 72 which in turn is in engagement with a stop shoulder 73 of the stub shaft 14.

Spirally threaded to the sleeve 68 is a disk member 76 provided with an internal spiral thread 78. Held between the disk member 76 and the pressure ring 80 is a thrust bearing 82. The pressure ring 80 is keyed for rotation with the plate 34 by lugs 84 extending from projections 86 and receiving the ends of levers 40. The projections 86 bear against the rounded ends 54 of the levers 40. Springs 87 hold part 80 to lever 40. The disk 76 is provided with a lubricating packing 88 in communication by a duct 90 with the surface of the spiral threads.

It will be apparent from the construction thus far described that the disk 76 is normally rotatable with the shaft 14 and the driving and driven clutch members are normally held in frictional contact. However, if a retarding pressure is applied to the disk 76, the continued rotation of the shaft 14 will tend to urge the disk 76 rearwardly in a direction to release the engagement of the clutch members. In order to apply the retarding pressure to the disk 76, I show a lever 92 which may be in the form of a clutch pedal and which is pivotally supported by the ball-shaped stud 94 bolted to a flange 96 of the casing 10. The lever 92 is formed with a yoke-shaped lower end 98 having open slots 100 for carrying, by pins 102, the pressure-applying member 104, (as shown in Figure 2). The member 104 is drum-shaped in formation and its rim extends over the edge of the disk 76. A locking ring 106 is provided to prevent separation of the disk 76 from the member 104. The member 104 has secured to its friction flange a ring 108 disposed in opposition to the friction surface 110 of the disk 76. The member 104 is normally held by the pressure of a light spiral spring 112 in frictional contact with the disk 76. The lever 92 is normally held in retracted position by spring 114 and the opening 116 through the casing 10 through which the lever 92 extends is closed by a slidable disk 118 held by spring 120. In order to allow a slight rotation of the lever 92 with respect to the ball-shaped support 94 but to prevent greater movement, a pin 122 is shown to extend through a slot 124 of the lever 92.

The operation of the device as described should be readily apparent. When the operator desires to disengage the clutch he applies light pressure to the pedal lever 92 to produce counter-clockwise movement with respect to the ball-shaped support 94. The drum shaped element 104 is therefore urged axially towards the disk 76 which is rotating at the speed of the shaft 14. The frictional retarding pressure causes a relative displacement of the disk 76 with respect to the shaft 14 and the disk 76 therefore turns and is caused to travel by the spiral threads axially towards the clutch members. The axial movement tends to apply pressure to the levers 40 and thereby disengages the clutch. A smooth disengaging action is obtained since, as soon as the disk 76 is moved axially, the retarding pressure applied to it is decreased unless the operator continues to move the lever 92 to follow up the movement of the disk 76. When the clutch reaches its full open position the ring 76 slips with respect to the drum-shaped element 104. Upon releasing the pressure upon the lever 92 and permitting its return movement by the force of spring 114, the clutch springs 30 tend to close the clutch and force the disk 76 back to its normal position since the spiral thread is of such pitch as to be reversible.

The construction shown in Figure 2 is substantially the same as in Figure 1 except as to certain detail modifications. In this form the stub shaft 14' has integrally formed therewith a spiral thread 70' and the straight splines 18' do not extend as far as in Figure 1. In this form an additional spiral thread 126 is cut through the straight splines 18' to allow the disk member 76' to be threaded over the spline portion of the shaft 14' to a position cooperating with the spiral thread 70'. This construction enables a greater amplification since the pitch diameter of the spiral thread may be less than in the construction shown in Figure 1.

It should be noted that the construction disclosed in Figure 1 is capable in operation of opening the clutch without rotation of the shaft 14 or relative rotation between the disk 76 and the pressure plate 104 since the inner spiral 68 is free to slide to the right or forwardly of the vehicle. Rotation of the shaft 14, which is always in one direction, tends to maintain the sleeve 68 against the cushioning abutment 72.

I claim:

1. In combination with a motor vehicle, a driving clutch member, a driven clutch member, a driven shaft keyed to said driven clutch member, resilient means normally holding said clutch members in frictional engagement, a clutch opening lever pivotally carried by said driving clutch member and normally rotatable therewith a disk member coaxially mounted on said shaft and spirally coupled thereto, said disk member being arranged to transmit movement to said pivoted lever upon longitudinal movement with respect to said shaft and means for producing frictional pressure upon said disk member in a direction to cause movement for opening of said clutch assisted by the rotation of said shaft.

2. In combination with a motor vehicle, a clutch comprising driving and driven clutch members resiliently held in frictional engagement, a shaft rotatable with said driven clutch member, a spiral thread upon said shaft, a spirally threaded member carried by said shaft, means for disengaging said clutch by movement of said spirally threaded member towards said driving clutch member, a pivoted clutch lever, a friction disk member carried by said clutch lever arranged to frictionally retard the rotation of said spirally threaded member and to exert pressure upon said spirally threaded member in a direction tending to disengage said clutch upon movement of said lever in one direction.

3. In combination with a motor vehicle, a clutch comprising driving and driven clutch members resiliently held in frictional engagement, a lever carried by said driving clutch member and adapted upon movement to disengage said clutch, a shaft rotatable with said driven clutch member, a thrust collar coaxially mounted on said shaft and rotatable with said driving clutch member, said thrust collar bearing against said lever to disengage said clutch upon longitudinal movement of said collar with respect to said shaft, a rotatable disk member spirally coupled to said shaft for normal rotation therewith but capable of longitudinal movement in a direction to move said thrust collar to disengage said clutch and means controllable by the operator for producing frictional retardation of said disk member whereby said disk member will be caused to rotate relative to said shaft and move longitudinally in a direction to disengage said clutch.

4. In combination, a driving clutch member, a driven clutch member, a driven shaft coupled to said driven clutch member, resilient means normally holding said clutch members in frictional engagement, a disk member carried by said driven shaft spirally coupled thereto, means interposed between said disk member and said driven clutch member operative upon displacement of said disk member towards said driven clutch member to decrease the frictional engagement between said clutch members and means for exerting frictional pressure upon said disk member in a direction to move said disk member towards said driven clutch member whereby a portion of the energy required for disengaging the driven clutch member from the driving clutch member may be derived from the rotation of the driven shaft.

5. In combination, driving and driven clutch members resiliently held in frictional engagement, a shaft rotatable with said driven clutch member, a spiral thread upon said shaft, a spirally threaded member carried by said shaft coupled to the spiral thread thereon, means for disengaging said clutch members by movement of said spirally threaded member towards said driven clutch member, a clutch lever, a non-rotatable friction disk member carried by said clutch lever arranged upon operation of said clutch lever to exert friction upon said spirally threaded member in a direction tending to disengage said clutch members whereby a portion of the energy required may be derived from the rotation of the driven shaft.

6. In a servo clutch, a driving clutch member, a driven clutch member, a driven shaft rotatable with said driven clutch member, means for producing engagement of said clutch members, a member normally rotatable with but retardable with respect to said driven shaft, a thrust bearing axially displaceable with respect to said driven shaft in a direction to disengage said clutch members upon relative rotation between said normally rotatable but retardable member and said driven shaft and operator-controlled means for frictionally retarding the rotation of said normally rotatable but retardable member to produce disengagement of said clutch members.

7. In a servo clutch, a driving clutch member, a driven clutch member, a driven shaft rotatable with said driven clutch member, means rotatable with said driving clutch member for producing engagement of said clutch members, lever members pivotally mounted on and rotatable with said driving clutch member for producing disengagement of said clutch members, a member normally rotatable with but retardable with respect to said driven shaft, a thrust bearing axially displaceable with respect to said driven shaft in a direction to disengage said clutch members by movement of said lever members and operator-controlled means for frictionally retarding the rotation of said normally rotatable but retardable member to produce disengagement of said clutch members.

8. In a servo clutch, a driving clutch member, a driven clutch member, a driven shaft rotatable with said driven clutch member, means rotatable with said driving clutch member for producing engagement of said clutch members, a member spirally coupled to said driven shaft normally rotatable but retardable with respect to said shaft, a thrust bearing concentrically mounted with respect to said shaft between said member and said clutch members axially displaceable with respect to said shaft in a direction to disengage said clutch members and operator-controlled means for frictionally retarding the rotation of said normally rotatable but retardable member to produce disengagement of said clutch members.

9. In a motor vehicle, a fly-wheel constituting a driving clutch member, a driven transmission shaft rotatably supported at one end by a transmission casing and at the other end by said fly-wheel, a driven clutch member rotatable with said transmission shaft, means for producing engagement between said clutch members, a normally rotatable but retardable member mounted on said transmission shaft intermediate said transmission casing and said clutch members, means for producing disengagement of said clutch, a thrust bearing through which movement may be transmitted to disengage said clutch members upon relative rotation between said normally rotatable and retardable member and said transmission shaft and operator-controlled means for producing frictional retardation of said rotatable member to produce disengagement of said clutch members.

Signed at Chicago, Illinois, this 24th day of July, 1931.

EDWARD A. ROCKWELL.